United States Patent [19]

Pardy

[11] Patent Number: 5,257,548

[45] Date of Patent: Nov. 2, 1993

[54] SECURITY TEST DEVICE

[75] Inventor: Ronald Pardy, Tiptree, United Kingdom

[73] Assignee: Ford Motor Company, Dearborn, Mich.

[21] Appl. No.: 672,281

[22] Filed: Mar. 20, 1991

[51] Int. Cl.⁵ .............................................. G01L 5/00
[52] U.S. Cl. .................................... 73/862.01; 285/93
[58] Field of Search ............... 73/862.01, 834; 285/23, 285/93; 403/27, 298; 116/212, 307

[56] References Cited

U.S. PATENT DOCUMENTS

| | | | |
|---|---|---|---|
| 3,762,059 | 10/1973 | Dawson | 285/93 |
| 4,667,837 | 5/1987 | Vitello et al. | 215/228 |
| 4,687,114 | 8/1987 | Crisci | 215/256 |
| 4,690,297 | 9/1987 | Hoft et al. | 220/273 |
| 4,753,458 | 6/1988 | Case et al. | 285/93 |
| 4,946,205 | 8/1990 | Washizu | 285/93 |
| 4,948,176 | 8/1990 | Bartholomew | 285/93 |
| 4,979,765 | 12/1990 | Bartholomew | 285/93 |

*Primary Examiner*—Richard E. Chilcot, Jr.
*Assistant Examiner*—Elizabeth L. Dougherty
*Attorney, Agent, or Firm*—Daniel M. Stock; Roger L. May

[57] ABSTRACT

In order to test whether a push-fit joint has been correctly assembled, a test device is assembled as part of the joint. The test device is constructed with an included rupturable region which will rupture at a predetermined pull-out force. After assembly of the joint, the test device is pulled. If the joint has been misassembled, then the pull out force will be sufficient to disassemble the joint, but if the joint has been correctly made, then the test device will break at the rupturable point. The absence of the visible end of the test device will then indicate that the joint has been correctly assembled and the assembly has been tested.

6 Claims, 1 Drawing Sheet

SECURITY TEST DEVICE

BACKGROUND OF THE INVENTION

This invention relates to a security test device for checking the condition of a push-fit assembly.

Where two parts are to be connected together by a push-in action, it is desirable to be able to check whether the assembly process has been correctly performed. In many push-fit or push-in joints, one part must be pushed into the other through a predetermined distance in order to correctly make the joint. However, it may be possible for the two parts to be apparently correctly connected on superficial inspection, but in fact to be incorrectly connected because the parts have not been pushed together far enough.

It is possible for the assembly worker to check the condition of a joint by exerting a pulling force after having carried out the pushing-in action. However, this has the disadvantage that if the worker pulls too hard, he may damage the assembled joint. If he does not pull hard enough, then a fault condition may not be detected and there will be no visible indication on the joint to show whether or not it has been checked.

SUMMARY OF THE INVENTION

According to the present invention, there is provided a test device for a push-in joint between two components, the device comprising a first part to be fixed to one of the components, a second part which can be gripped to exert a pull force in a direction opposite to the push-in direction, and a rupturable region which will break when a predetermined pull force is applied to the second part so that the second part becomes detached from the joint.

The rupturable region may be formed between the first and second parts, so that when the rupturable region breaks, the first part remains fixed to said one of the components. Alternatively, the first part itself may rupture so that the entire device becomes detached from the joint when the rupturable region breaks.

With this device, a consistent joint testing force can be applied to the assembled joint by pulling on the second part of the device until the rupturable region breaks. The second part of the device is then discarded, and a quick visual inspection of the joint will show (because of the absence of the second part) that the necessary assembly test has been performed.

The second part is preferably brightly colored or made easily visible in some way so that it is easy to carry out a visual inspection to see whether the assembly test has been performed.

In one form of the invention, the second part is in the form of a ring into which an assembly worker can place his or her finger in order to exert a pull force.

Where said one of the components is a tubuler member, the first part of the device may be a ring which engages behind a shoulder on the component so that the test device can be attached to the component merely by slipping it over one end of the component.

According to a second aspect of the invention, there is provided a method of testing a push-in joint between two components, wherein a test device being rupturable upon application of a force of predetermined magnitude is fixed to one of the components. The joint is assembled and a pull-out force is applied to the joint by pulling the test device until the device ruptures, the predetermined rupture force being set such that the pull-out force applied would be sufficient to disassemble an incorrectly assembled joint but not sufficient to cause damage to a correctly assembled joint.

BRIEF DESCRIPTION OF THE DRAWINGS

The invention will now be further described by way of example with reference to the accompanying drawings, in which.

DESCRIPTION OF THE PREFERRED EMBODIMENT

Figure 1:
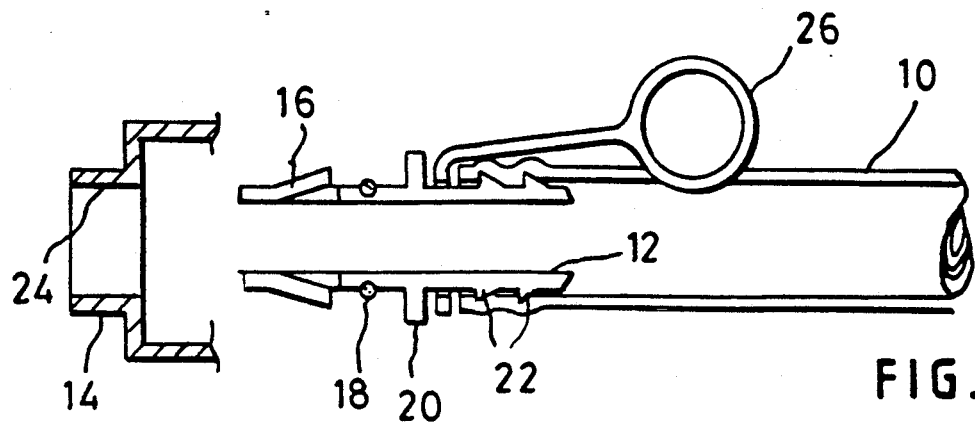
FIG. 1 shows a push-in joint with a test device according to the invention, before assembly of the joint.
Figure 2:
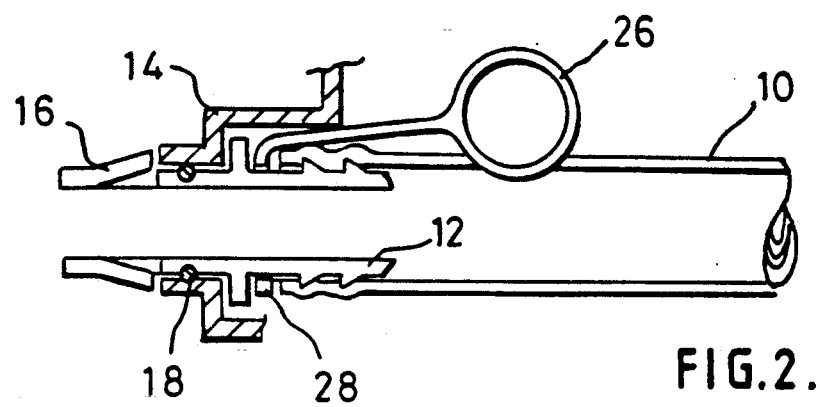
FIG. 2 shows the same joint after assembly.
Figure 3:
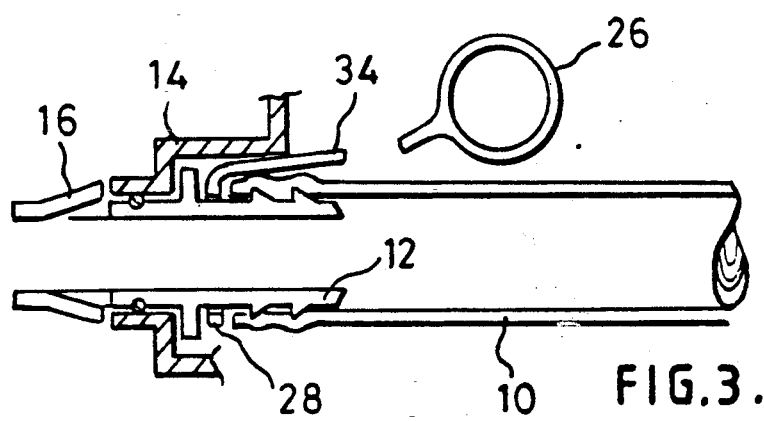
FIG. 3 shows the same joint after use of the test device.

In the drawings, a flexible tube 10 is fitted at its free end with an end fitting 12. The end fitting consists of a tubular body with spring legs 16 at its outer end, an O-ring seal 18, a shoulder 20 and annular ridges 22 for retaining the tube 10. The end fitting 12 is intended for insertion into a bore 24 in a separate component 14. As can be seen in FIG. 2, when the end fitting is properly inserted into the bore 24, the spring legs 16 which are compressed inwardly during passage through the bore 24 spring out to lock the fitting 12 in the component 14, and the O-ring seal 18 then makes sealing contact with the walls of the bore 24. This is the correctly assembled condition.

Figure 5:
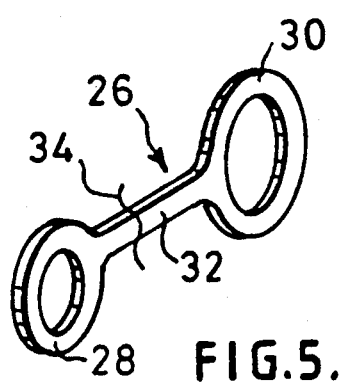
FIG. 5 is a perspective view of the test device in accordance with the invention.

A test device 26 is assembled onto the end fitting 12 and is located between the shoulder 20 and the end of the tube 10. The test device is fitted in this position by placing a first part which ends in a ring 28 (see FIG. 5) over the end fitting 12 before the tube 10 is put in place. The test device then has an exposed ring 30 through which a finger can be inserted, and a limb 32 joining the two rings 28 and 30. The limb 32 is constructed so that it can rupture upon imposition of a predetermined load, and in FIG. 5, the rupturable region or snap zone is indicated at 34. This may be accomplished by modifying the cross-section of the test device 26 at a position where rupture is desired.

When the joint is correctly assembled as shown in FIG. 2, the ring 30 is clearly visible. The final testing stage after assembly is carried out by placing a finger through the ring 30 and pulling until the limb 32 snaps at 34. The force thus applied will be sufficient to pull the end fitting 12 out of the component 14 if the fitting is in the condition shown in FIG. 4, i.e., if it has not been pushed fully home, but will not be enough to dislodge the tube 10 on the fitting 12 if the fitting is in the condition shown in FIG. 2, i.e., if it has been correctly assembled. Once the test device has been broken, the ring part 30 is then thrown away, and because this part is now absent from the joint, a visual inspection will show that the joint has been checked.

Figure 4:
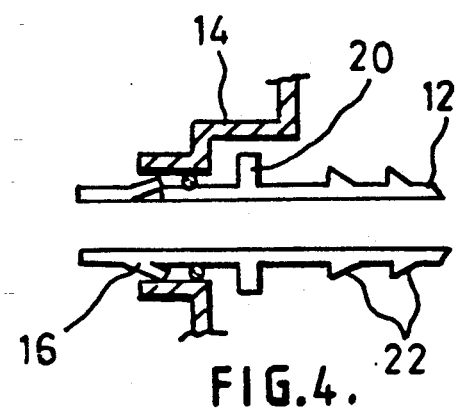
FIG. 4 shows part of the push-in joint in a misassembled condition.

FIG. 4 illustrates a misassembled condition of the joint, where the end fitting 12 has not been pushed fully in and the spring legs 16 has not opened out again on the far side of the bore 24. If the ring 30 is pulled with the joint in this condition, then the end fitting 12 will put out of the component 14. The joint can then be made properly.

The ring part 30 of the test device is preferably brightly colored, for example, by painting it yellow so that its presence or absence will be readily apparent from a visual inspection.

The position of the snap region 34 will be chosen so that the broken end of the limb 32 which remains on the joint remains concealed so far as possible.

The snap region 34 does not have to be between the two rings 28 and 30. There may be a weakened portion around the circumference of the ring 28, so that when rupturing occurs, the whole of the ring is pulled away from the joint.

Although rings have been shown at the opposite ends of the test device for attachment to the joint and for engagement with a finger, other forms of these ends of the device could be used.

The test device described thus provides a cheap, simple and easily verifiable system for checking that the joints have been correctly assembled and carried out.

I claim:

1. A test device for a push-in joint between two components assembled together through relative movement in one push-in direction, the device comprising a first part fixed to one of the components, a second part grippable to exert a pull force in a direction opposite to the push-in direction, and a rupturable region being broken when a predetermined pull force, exerted in a direction opposite to the push-in direction, is applied to the second part so that the second part becomes detached from the joint.

2. A test device as claimed in claim 1, wherein the rupturable region is formed between the first and second parts, so that when the region breaks, the first part remains fixed to said one of the components.

3. A test device as claimed in claim 1, wherein the first part includes the rupturable region so that the entire device becomes detached from the joint when the rupturable region breaks.

4. A test device as claimed in claim 1, wherein second part is brightly colored.

5. A test device as claimed in claim 1, wherein the second part is in the form of a ring receiving the finger of a worker for exertion of a pull force.

6. A test device as claimed in claim 1, wherein said one of the components is a tubular member and the first part of the device is a ring which engages behind a shoulder on the component so that the test device is attached to the component by slipping it over one end of the component.

* * * * *